May 17, 1955  E. H. WELLER  2,708,596
SPRAYER
Filed Dec. 27, 1951  2 Sheets-Sheet 1
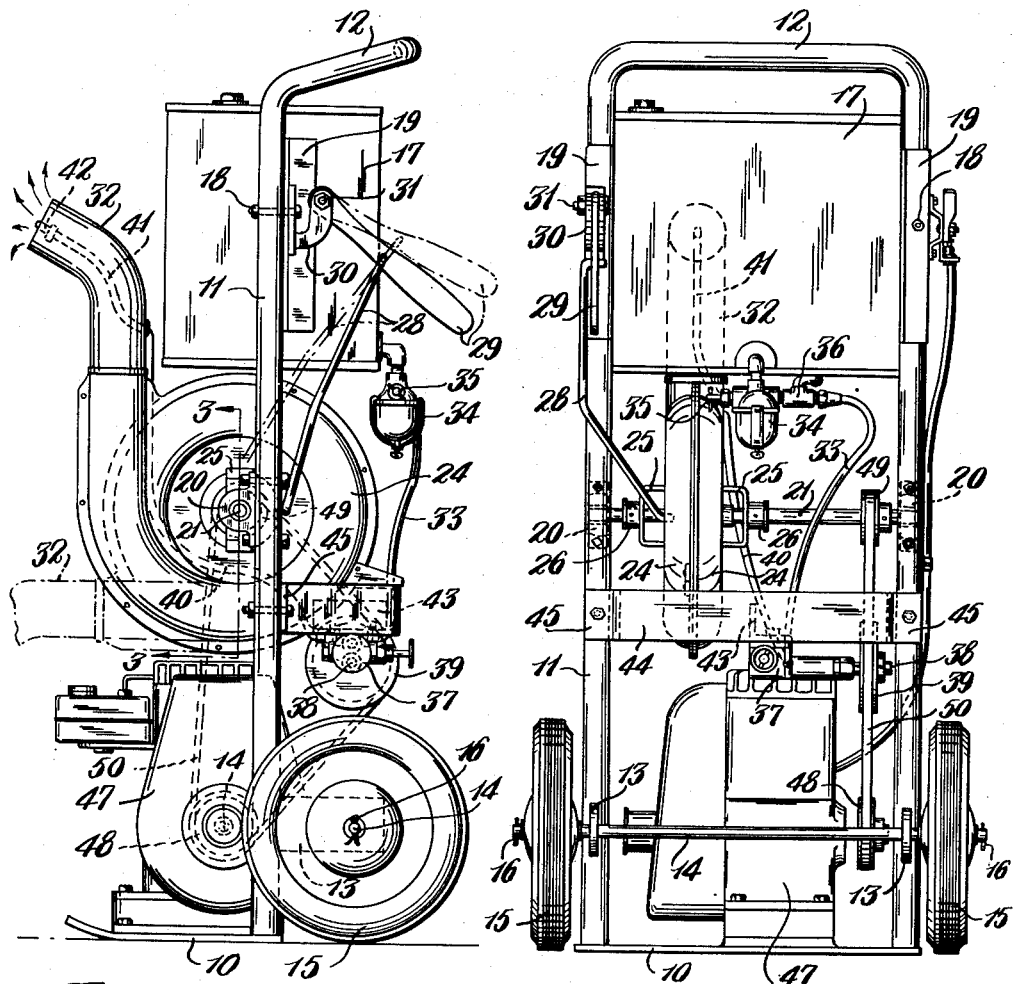
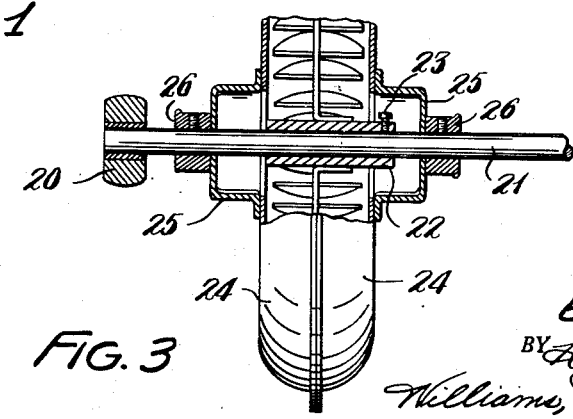
INVENTOR.
EARL H. WELLER
BY Hudson, Boughton,
Williams, David & Hoffmann
ATTORNEYS May 17, 1955

E. H. WELLER 2,708,596

SPRAYER

Filed Dec. 27, 1951

INVENTOR.
EARL H. WELLER
BY Hudson, Boughton,
Williams, David & Hoffmann.
ATTORNEYS United States Patent Office 2,708,596
Patented May 17, 1955

2,708,596

SPRAYER

Earl H. Weller, Bay Village, Ohio, assignor to
Leonard M. Strunk, Coatesville, Pa.

Application December 27, 1951, Serial No. 263,651

2 Claims. (Cl. 299—30)

This invention relates to improvements in power sprayers, more particularly a sprayer mounted on a wheeled truck having a prime mover such as a small gasoline engine by means of which a centrifugal blower is operated, liquid for spraying purposes being delivered to the blower spout in order that the liquid spray may be entrained by the rapidly moving air blast from the blower for conducting the spray material in an air driven cloud into trees and foliage or barns or stables or into fields of growing plants. Embodiments of the invention are capable of causing the spray to reach effectively to positions thirty or thirty-five feet distant from the machine.

One of the objects of the invention is the provision of means for directing the spray in different directions in a vertical plane, preferably control means of this kind which may be actuated easily by the operator while the truck is in motion.

Another object is the provision in apparatus of this character of means for delivering spray material under pressure to the air discharge spout of the blower, whereby the spray material is broken up into finely divided particles which may be carried forward on the air blast most effectively.

Other objects and features of novelty will appear as I proceed with the description of those embodiments of the invention which, for the purposes of the present application, I have illustrated in the accompanying drawings in which Fig. 1 is a side elevational view of a machine embodying the invention at rest upon the ground and with the discharge spout directed upwardly at an angle.

Fig. 2 is a rear elevational view of the same.

Fig. 3 is a fragmental detail sectional view on a larger scale, the view being taken substantially on the line 3—3 of Fig. 1.

Figure 4:
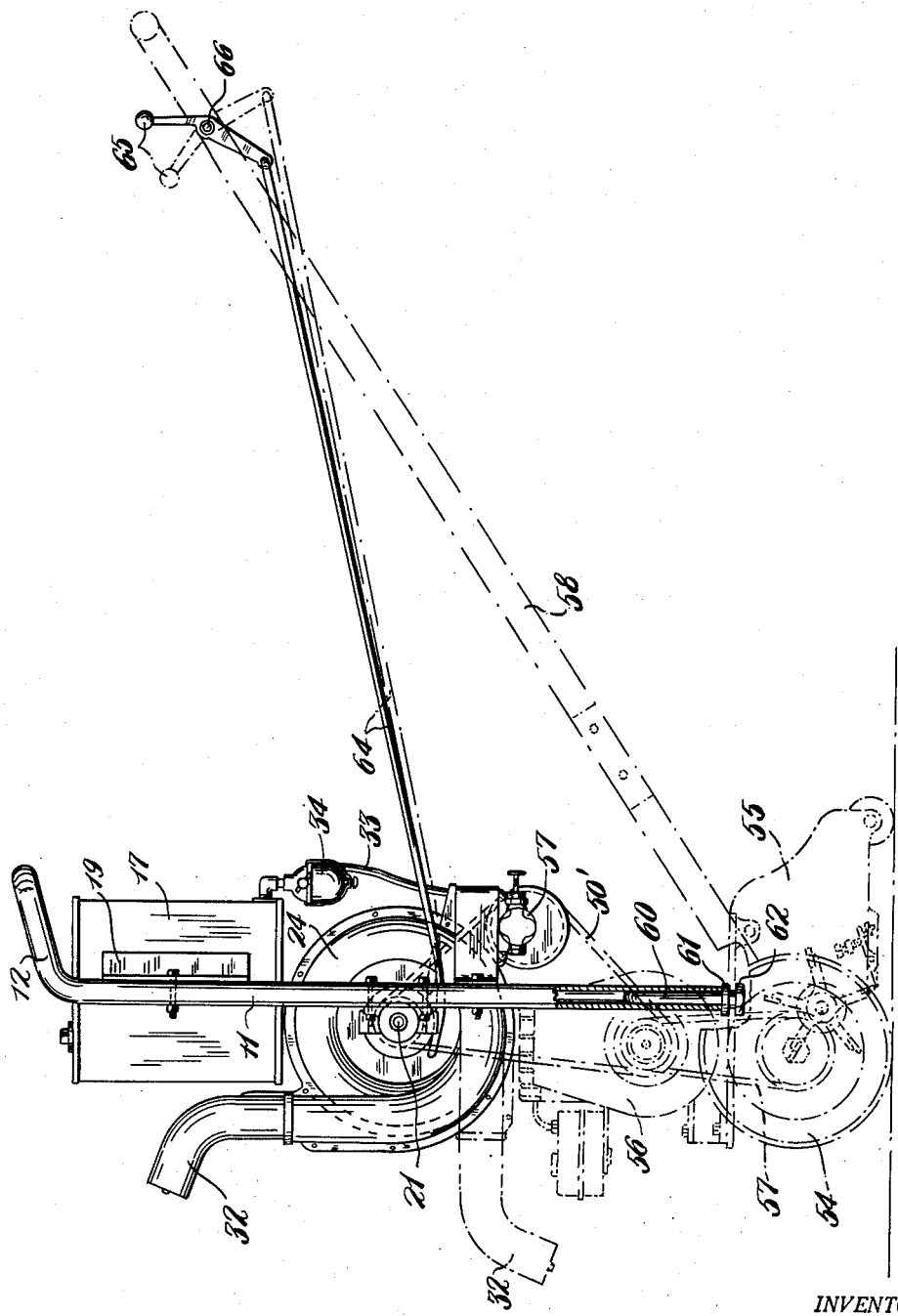
Fig. 4 is a side elevational view of a modification in which the invention is embodied in an attachment for a power mower, wherein the sprayer is adapted to be driven by the mower engine.

The embodiment of the invention illustrated in Figs. 1 and 2 comprises a base plate 10 of metal to which are welded the lower ends of an inverted U-frame 11 of steel tubing, having at the top a rearwardly extending portion 12 constituting a handle. Projecting rearwardly from the two legs of the frame 11 there are two plates 13, preferably welded to the frame, in which is mounted an axle 14. Ground wheels 15 are rotatably mounted on this axle, being held against movement longitudinally of the axle by suitable means such as cotter pins 16. When the operator desires to move the machine he grasps the handle 12 and tilts the machine backwardly on its wheels 15, after which it may be pushed or pulled around as desired. The parts of the apparatus mounted on the frame are so disposed that when the frame is tilted backward to a convenient angle for the operator the center of gravity will be disposed substantially above the axle 16, thereby making it relatively easy for the machine to be moved about.

Near the top of the frame a tank 17 is attached to the upright members thereof by any suitable means, such as bolts 18 extending through anglebars 19 welded to the tank. The tank is adapted to hold a supply of liquid spray material.

At about midway of the height of the frame the legs thereof carry a pair of bearing blocks 20 in which is rotatably mounted a blower shaft 21. Fastened to this shaft is a centrifugal fan blade assembly comprising a hub 22 which is fixed to the shaft by setscrew 23 or other suitable means. A blower casing 24 of substantially conventional form is mounted to float on this shaft. For this purpose the casing may have welded thereto a pair of metal brackets 25 of U-shape which are drilled to receive the shaft 21 rotatably. Means is provided to hold the casing against movement lengthwise of the shaft, this means in the illustrated case consisting of a pair of collars 26 secured to the shaft by setscrews and engaging the outer surfaces of the two brackets 25.

The casing 24 is held from rotational movement and may be secured in various selected angular positions by manual control means comprising preferably a rod 28 which has an inturned lower end pivotally connected with the casing 24 and an inturned upper end pivotally connected with a hand lever 29 which is pivotally mounted between the bifurcated ends of a bracket 30 carried by one of the legs of the frame. A bolt 31 constitutes the pivot for lever 29, and it may be drawn up the amount required to provide sufficient friction to hold the lever in any of its various positions of adjustment.

At the delivery end of the blower casing there is mounted a spout 32 which may consist of a sheet metal elbow, the delivery end of which extends upwardly and forwardly when the parts are in the full line position of Fig. 1, this being one limit of motion of the blower casing. The other limit is indicated in dot and dash lines. The angle of throw is preferably about ninety degrees. Suitable stops may be provided to prevent adjustment beyond these limits, and the control lever 29 may be set in any one of an infinite number of positions between the limits indicated.

Connected with the tank 17 at the bottom thereof there is a strainer bowl 34. A needle valve within the bowl may be operated by a handled shaft 35 to control the rate of gravity feed from the tank into the bowl. On the output side of the bowl there is an on and off valve 36 to which is connected a fluid conductor 33, preferably copper tubing, which extends down to the intake side of a pump, preferably a gear pump 37, which has a drive shaft 38 carrying a V-pulley 39. From the output side of the pump a flexible conductor 40 extends up to and is connected with another piece of copper tubing 41 that extends through the spout 32 and carries a spray nozzle 42 centered in the spout at the delivery end of the latter.

Gear pump 37 is supported from a small angle iron 43, one end of which is welded to a transverse brace 44 that extends across the frame and has feet 45 that are bolted to the legs of the frame. Brace 44 is generally U-shape in order to clear the blower casing 24. The mounting of the pump 37 on the anglebar 43 is such that the pump may be moved somewhat inwardly and outwardly, thereby adjusting the position of the pulley 39.

A small gasoline engine designated generally by the reference numeral 47 is bolted to the base plate 10 of the truck. Its crankshaft carries a V-pulley 48 disposed in the same plane with pulley 39. Also in this same plane there is a V-pulley 49 on shaft 21. A V-belt 50 threaded over these three pulleys serves to drive the pump shaft and the blower shaft from the engine shaft.

Slack in the belt may be taken up by adjustment of the position of pump 39 on anglebar 43.

In Fig. 4 there is shown a modification in which the sprayer apparatus is in the form of an attachment for a power lawn mower, the engine of the lawn mower being used for driving the sprayer and the attachment being readily removable when its services are not required. In the drawing one of the ground wheels of the mower is shown at 54. The frame 55 of the mower is supported partially at least upon the ground wheels. A gasoline engine 56 is carried on the frame and may be connected by means of sprockets and a chain 57 to drive the ground wheels and indirectly the reel of the mower. The handle by means of which the operator guides the machine is indicated at 58.

In order that the sprayer attachment may be mounted upon the lawn mower it is necessary to mount in the frame of the latter two posts 60. This may be accomplished by boring suitably spaced holes through a horizontal portion of the mower frame, through which a constricted lower part of the posts may be caused to extend. A collar 61 is provided on each post for engagement with the upper surface of the frame member, and the lower end of the constricted part of the post is threaded to take a nut 62. When the nuts are tightened these posts are quite rigidly anchored in the mower frame.

The frame of the attachment may be substantially identical with that of the first described form of the invention except that the base plate 10 with the engine supported thereby is omitted. The tubular legs of the frame are slipped over these posts which are dimensioned to fit snugly within the legs. Thus the attachment is securely and rigidly supported on the mower frame, but is easily removed therefrom.

Ordinarily when the sprayer attachment is to be used the engine 56 will be disconnected from the ground wheels 54 and the machine will be propelled by the operator pushing on the handle 58. The engine 56 will then be connected with the pump 57 and the blower shaft 21 by a belt 50'.

The control for adjusting the angular position of the blower casing 24 and spout 32 in this case consists of a rod 64 connected to the casing in a manner similar to that of rod 28. Rod 64 however is relatively long and extends back to a lever 65 which is pivoted at 66 to handle 58. The operator may hold the casing and spout in the desired angular position by keeping his hand on the lever 65 and moving the spout up or down as required, but a frictional grip of the lever may be provided at the pivot point as in the first described form of the invention, so that the lever will remain in an adjusted position as long as may be required.

Having thus described my invention, I claim:

1. In combination with a truck having a frame and two forward transversely aligned ground wheels, a prime mover mounted on said frame between said wheels and a drive pulley for said prime mover, of two upwardly extending posts mounted on said frame on opposite sides of said prime mover, an insecticide dispensing attachment comprising a transverse planar frame with upstanding legs connected at the top, an insecticide tank mounted at the upper end of said frame, a blower carried by the frame beneath said tank, a drive pulley for said blower adapted to be belt connected with said prime mover pulley, the legs of said frame being tubular and fitting snugly over said posts for removably supporting said attachment and said legs being of a length beneath the blower sufficient to enable the blower to clear said prime mover, and means for conducting insecticide material from said tank to said blower, mixing it with air from said blower and ejecting the mixture.

2. In combination with a truck having a frame and two forward transversely aligned ground wheels, a prime mover mounted on said frame between said wheels and a drive pulley for said prime mover, of two upwardly extending posts mounted on said frame on opposite sides of said prime mover, an insecticide dispensing attachment comprising a transverse planar frame with upstanding legs connected at the top, an insecticide tank mounted at the upper end of said frame, a blower carried by the frame beneath said tank, a drive pulley for said blower, a rotary pump carried by said frame, a pulley on said pump in the same plane with said blower pulley, said blower and pump pulleys being adapted to be driven by a single belt from said prime mover pulley, the legs of said frame being tubular and fitting snugly over said posts for removably supporting said attachment, said legs being of a length beneath the blower sufficient to enable the blower to clear said prime mover, and means for conducting insecticide material from said tank to said pump, from the pump to said blower, mixing it with air from the blower and ejecting the mixture.

References Cited in the file of this patent

UNITED STATES PATENTS

| | | |
|---|---|---|
| 1,515,476 | Greenfield | Nov. 11, 1924 |
| 2,256,561 | Hoelscher | Sept. 23, 1941 |
| 2,425,419 | Carnes | Aug. 12, 1947 |
| 2,454,339 | Potts et al. | Nov. 23, 1948 |
| 2,573,784 | Asbury | Nov. 6, 1951 |
| 2,583,753 | Spreng et al. | Jan. 29, 1952 |

FOREIGN PATENTS

| | | |
|---|---|---|
| 333,794 | Great Britain | Aug. 21, 1930 |